Sept. 3, 1940.    T. A. McGREGOR    2,213,322
CONTROL MECHANISM
Filed May 16, 1938
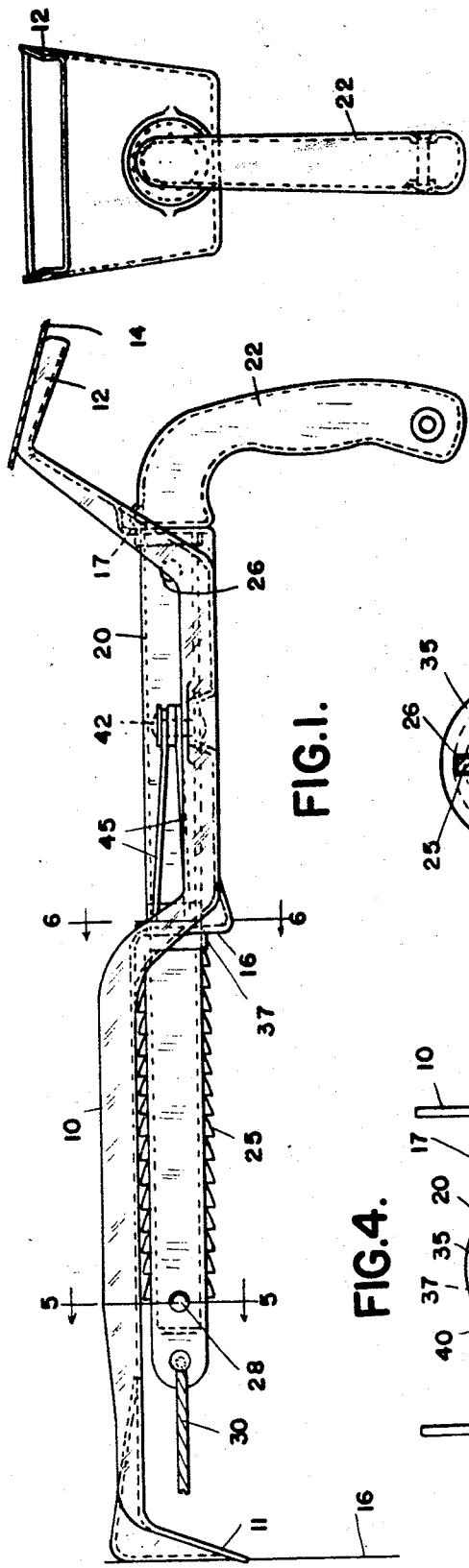
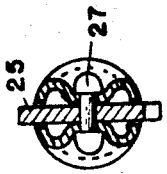
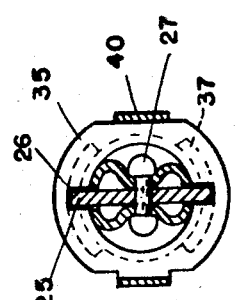
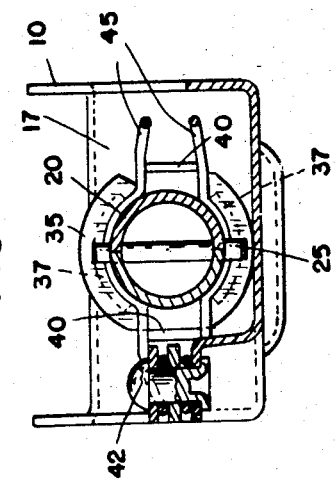
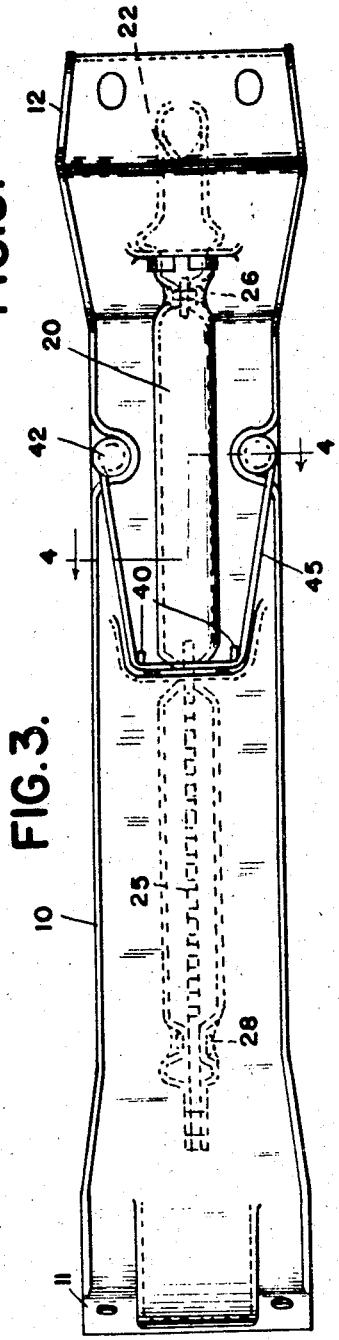
INVENTOR
THOMAS A. McGREGOR
BY *Swan, Faye & Hardesty*
ATTORNEYS Patented Sept. 3, 1940

2,213,322

UNITED STATES PATENT OFFICE 2,213,322

CONTROL MECHANISM

Thomas A. McGregor, Pontiac, Mich., assignor to The American Forging & Socket Company, Pontiac, Mich., a corporation of Michigan Application May 16, 1938, Serial No. 208,117

8 Claims. (Cl. 74—502)

This invention relates to manually operable control mechanisms. Although particularly described in connection with a brake-operating handle for motor vehicles, the utility of the invention extends to many if not all types of hand operated devices of the class which automatically lock in any set position, but may be selectively released at will. An important object of the invention is to provide such a device of the ratchet type, which is of greatly simplified construction and less expensive to manufacture than present known devices of this character, which provides very secure and positive locking in any desired set position, and is more easily releasable than such ratchet devices as commonly constructed.

A further object is to provide such a device having a sliding motion and which is adapted to be mounted on the instrument panel of a vehicle, without obstructing the floor thereof.

Another object is a device of the indicated character which incorporates no parts apt to catch the fingers or clothing of an occupant or operator of the vehicle, and which is so easily operable that women and persons not having great strength of hands and arms may easily release the same, no matter how hard the brakes or other controlled mechanism may be set.

Another object is to provide an improved ratchet mechanism for a device of the character indicated, having novel combined spring and pawl means, located to be reinforced by the remainder of the mechanism and subjected only to direct transverse compression stresses when in locking engagement with the ratchet, and so arranged, furthermore, that by means of a single control handle, movable independently in two directions, the ratchet and pawl may either be locked in any desired position or released.

Other objects and advantages will be apparent from the following description, wherein reference is made to the accompanying drawing illustrating a preferred embodiment of my invention and wherein similar reference numerals designate similar parts throughout the several views.

In the drawing:

Figure 1 is a side elevational view of a control assembly incorporating the principles of this invention, constructed in a manner rendering it suitable for installation in a motor vehicle to control the brakes thereof, the instrument panel and cowl portions to which the assembly is attached being fragmentarily shown in cross section.

Figure 2 is an end elevational view of the device.

Figure 3 is a top plan view thereof.

Figure 4 is a vertical cross section taken substantially on the line 4—4 of Figure 3 and looking in the direction of the arrows, and Figures 5 and 6 are cross sectional detail views taken substantially on the lines 5—5 and 6—6 respectively of Figure 1 and looking in the direction of the arrows.

Referring now to the drawing, reference character 10 designates the supporting frame of the device, which may be pressed of sheet metal and provided with angular front and rear flanges 11, 12, respectively, adapted to secure it to the instrument panel as 14 and dash panel 16 of a motor vehicle (other portions of the vehicle are not shown). The frame, of relatively long and narrow and somewhat channeled contour, thus extends longitudinally of the vehicle, and as viewed from the side, as in Figure 1, will be seen to be provided with a dropped section pressed to provide substantially vertical front and rear walls 16, 17, respectively, through which the handle shaft 20 is slidable. At its exposed rear end the shaft carries a conveniently shaped hand grip portion 22 by which it may be both rotated and moved longitudinally.

The shaft may be of tubular form, being shown as comprised of two sections secured together by rivets as 26, 27, 28. Longitudinally disposed between the shaft sections at the front end of shaft assembly, farthest from the handle 22, and secured in position by the same rivets which hold together the shaft sections, is a ratchet plate 25, toothed top and bottom and projecting above and below the shaft, as shown. The forward end of the shaft may be connected to the brakes or other controlled mechanism as by a cable 30, the illustrative and typical arrangement shown being such that the brakes may be set by pulling the handle outwardly, toward the rear of the vehicle, the brakes being of course released when the handle is in the fully in-pressed or forward position in which it is shown in the drawing. When the handle is pulled outwardly, the ratchet plate slides through the vertical central wall 16, the ratchet plate and shaft being guided in a bushing 35 supported against the face of the wall 16 and limitedly rotatable relatively thereto. Slots 36 are provided in the bushing 35 to admit the ratchet plate, which thus slidably keys the bushing to the shaft. The opening in the wall 16 is of sufficient size to allow free sliding and rotation of the ratchet plate as well as the shaft portion, and cylindrical bearing flanges 37 project forwardly from the bushing 35 and rotatably mount the same in the opening in wall 16, the inner surfaces of such bearing flanges providing a bearing for the shaft 20. Lug portions 40 are turned rearwardly from the edges of bushing 35, one upon either side thereof. These project between a pair of spring pawl elements 45, one arranged to engage the top teeth of the ratchet plate, and the other the bottom teeth. The spring pawls are formed of U-shaped spring wire sections, secured to the frame by rivets 42. Each such pawl element has its bight portion, which engages the ratchet teeth, extending across the assembly just behind and preferably in sliding engagement with bushing 35. Such bight portion is also curved out of plane sufficiently to partly encircle the shaft assembly, as best shown in Figure 4.

The resiliency of the spring pawl elements urges them toward each other and against the shaft. They will also be seen to position the bushing 35, and by engagement with the lugs 40 to yieldably center the same and oppose rotation thereof, and thereby also center and oppose rotation of the handle. When the handle is pulled out, the pawl elements are lifted and ride over the ratchet teeth. By locking engagement with the teeth the pawls prevent return movement of the shaft, until the latter is rotated by means of the handle, the resultant rocking movement of the lugs 40, spreading the pawls sufficiently to free the ratchet teeth and allow the shaft assembly to return or be pushed inwardly.

What I claim is:

1. A control head assembly comprising in combination with a support, a slidable and rotatable shaft carried thereby, a toothed ratchet portion carried by the shaft, click pawl elements carried by the support and releasably engageable with the toothed ratchet portion to prevent unwanted return movement of the shaft, and means rotatable with but restrained against unwanted sliding movement with relation to the shaft and engageable with said click pawls to release the same in response to rotation of the shaft.

2. Means as set forth in claim 1 in which said shaft is slidable in a direction substantially perpendicular to an apertured portion, and said means rotatable with but restrained against unwanted sliding movement with relation to the shaft comprises a member journaled in said substantially perpendicular portion and keyed to the shaft, the shaft being freely slidable therethrough, and projecting portions carried by said element and engageable with said click pawl means.

3. Means as set forth in claim 1 in which the portion of said support through which said shaft is movable is disposed substantially perpendicular to the line of sliding movement of the shaft, said pawl means comprising a transversely extending portion backed by said perpendicular portion of the support to be reenforced thereby to transmit to the frame the stress exerted upon the pawl, when the latter is in locked position.

4. Means as set forth in claim 1 in which the portion of said support through which said shaft is movable is disposed substantially perpendicularly to the line of sliding movement of the shaft, said means rotatable with but restrained against unwanted sliding movement with relation to the shaft comprising a member journaled in said substantially perpendicular portion of the support and keyed to the shaft, the shaft being freely slidable therethrough, said pawl means comprising a transversely extending portion backed by said perpendicular portion of the support to be reenforced thereby and to transmit to the support the stress exerted upon the pawl means when the latter is in locked position, and pawl-actuating portions carried by and projecting from said member and engageable with said pawl means.

5. Means as set forth in claim 1 in which said pawl means includes a spring element having a flexible portion supported at one end by the support, and a dogging portion carried by the other end of said flexible portion engageable with said toothed portion, said dogging portion being backed by the support and held thereby against unwanted deflection when engaged with said toothed portion.

6. In combination with a support, a toothed ratchet portion movable therein, and pawl means for restraining unwanted movement of the ratchet portion, said pawl means consisting of a flexible spring wire element secured at one end to the support and having a free dogging portion laterally flexible to and from engagement with said toothed ratchet portion, said dogging portion being simultaneously engageable with a portion reenforced by the body of the support when engaged with said toothed ratchet portion and urged with sufficient force in the direction in which it opposes movement of said ratchet portion.

7. In combination with a support, a toothed ratchet portion movable therein, and pawl means for restraining unwanted movement of the ratchet portion, said pawl means having a flexible spring portion, a dogging portion urged thereby into engagement with said toothed ratchet portion, said dogging portion also being engageable with a portion reenforced by the body of the support when urged with sufficient force in the direction in which it opposes movement of the ratchet portion, said pawl means comprising a spring wire element of substantially U-shape having the ends of its leg portions attached to said support, and its bight portion constituting said dogging portion.

8. In combination with a support, a toothed ratchet portion movable therein, and pawl means for restraining unwanted movement of the ratchet portion, said pawl means having a flexible spring portion, a dogging portion urged thereby into engagement with said toothed ratchet portion, said dogging portion also being engageable with a portion reenforced by the body of the support when urged with sufficient force in the direction in which it opposes movement of the ratchet portion, said ratchet portion being slidable through and rotatable in a portion of the support, and means for actuating said pawl means in response to rotation of said ratchet portion.

THOMAS A. McGREGOR.